(12) United States Patent
Iwasa

(10) Patent No.: US 9,564,667 B2
(45) Date of Patent: Feb. 7, 2017

(54) BATTERY TEMPERATURE CONTROL UNIT INCLUDING HEAT EXCHANGER ARRANGED IN AIR FLOW PASSAGE OF UNIT CASE

(71) Applicant: Valeo Japan Co., Ltd., Kumagaya-shi (JP)

(72) Inventor: Akio Iwasa, Kumagaya (JP)

(73) Assignee: VALEO JAPAN CO. LTD., Kumagaya-Shi (JP)

( * ) Notice: Subject to any disclaimer, the term of this patent is extended or adjusted under 35 U.S.C. 154(b) by 326 days.

(21) Appl. No.: 14/360,940

(22) PCT Filed: Nov. 26, 2012

(86) PCT No.: PCT/JP2012/007573
§ 371 (c)(1),
(2) Date: May 28, 2014

(87) PCT Pub. No.: WO2013/080512
PCT Pub. Date: Jun. 6, 2013

(65) Prior Publication Data
US 2015/0118536 A1    Apr. 30, 2015

(30) Foreign Application Priority Data

Nov. 30, 2011  (JP) ................ 2011-261153

(51) Int. Cl.
*H01M 10/625* (2014.01)
*H01M 10/6563* (2014.01)
(Continued)

(52) U.S. Cl.
CPC .......... *H01M 10/625* (2015.04); *B60L 11/187* (2013.01); *H01M 10/6563* (2015.04);
(Continued)

(58) Field of Classification Search
CPC ............ H01M 10/625; H01M 10/6563; H01M 10/6565; B60L 11/187
(Continued)

(56) References Cited

U.S. PATENT DOCUMENTS

2004/0232891 A1* 11/2004 Kimoto ............... H01M 2/1077
320/150
2006/0181247 A1   8/2006 Marukawa et al.
(Continued)

FOREIGN PATENT DOCUMENTS

CN    101604776 A    12/2009
CN    101728597 A    6/2010
(Continued)

OTHER PUBLICATIONS

Amaral et al., Machine translation of FR 2865070 A1, Jul. 2005.*
(Continued)

*Primary Examiner* — Sean P Cullen
(74) *Attorney, Agent, or Firm* — Howard & Howard Attorneys PLLC

(57) ABSTRACT

A battery temperature control unit 1 for controlling a temperature of an internal space 21 of a module case 22 is provided. The battery temperature control unit 1 includes a unit case 3 which is arranged in the internal space 21 of the module case 22 and includes an air flow passage 4 inside the unit case 3. The battery temperature control unit 1 further includes a heat exchanger 11 arranged in the air flow passage 4. The unit case 3 includes a module opening sealing portion 31, which seals a module opening 24 formed in a wall surface of the module case 22. A module sealing surface 32 is formed in the module opening sealing portion 31, which closes the module opening 24 from an internal space 21 side. A first communication hole 36 and a second communication hole 37 are also formed in the module opening sealing (Continued)

portion 31, which allow the outside of the module case 22 and the inside of the unit case 3 to communicate with each other.

10 Claims, 17 Drawing Sheets

(51) Int. Cl.
*H01M 10/6565* (2014.01)
*B60L 11/18* (2006.01)
*H01M 2/10* (2006.01)
*H01M 10/663* (2014.01)
*H01M 10/6571* (2014.01)
*H01M 10/6569* (2014.01)
*H01M 10/6566* (2014.01)

(52) U.S. Cl.
CPC ...... *H01M 10/6565* (2015.04); *H01M 2/1077* (2013.01); *H01M 10/6566* (2015.04); *H01M 10/6569* (2015.04); *H01M 10/6571* (2015.04); *H01M 10/663* (2015.04); *H01M 2220/20* (2013.01); *Y02T 10/7005* (2013.01); *Y02T 10/705* (2013.01); *Y02T 90/16* (2013.01)

(58) Field of Classification Search
USPC ...................................... 429/120, 72, 82, 83
See application file for complete search history.

(56) References Cited

U.S. PATENT DOCUMENTS

| | | |
|---|---|---|
| 2009/0023056 A1 | 1/2009 | Adams et al. |
| 2011/0020676 A1 | 1/2011 | Kurosawa |

FOREIGN PATENT DOCUMENTS

| | | | | |
|---|---|---|---|---|
| CN | 101841072 A | 9/2010 | | |
| DE | 102009028291 A1 * | 2/2011 | ................ | F16L 5/02 |
| EP | 2 262 048 A1 | 12/2010 | | |
| FR | 2865070 A1 * | 7/2005 | ......... | B60H 1/00278 |
| JP | H 06-283213 A | 10/1994 | | |
| JP | 2000-260474 A | 9/2000 | | |
| JP | 2002-313441 A | 10/2002 | | |
| JP | 2009-227121 A | 10/2009 | | |
| JP | 2010-123298 A | 6/2010 | | |
| JP | 2011-116321 A | 6/2011 | | |
| WO | WO 2009/119037 A1 | 10/2009 | | |

OTHER PUBLICATIONS

Kern et al., Machine translation of DE 102009028291 A1, Feb. 2011.*
International Search Report for Application No. PCT/JP2012/007573 dated Feb. 26, 2013, 4 pages.
English language abstract and machine-assisted English translation for JPH 06-283213 extracted from the PAJ database on Jul. 9, 2014, 16 pages.
English language abstract and machine-assisted English translation for JP 2000-260474 extracted from the PAJ database on Jul. 9, 2014, 17 pages.
English language abstract and machine-assisted English translation for JP 2002-313441 extracted from the PAJ database on Jul. 9, 2014, 20 pages.
English language abstract and machine-assisted English translation for JP 2009-227121 extracted from the PAJ database on Jul. 9, 2014, 25 pages.
English language abstract and machine-assisted English translation for JP 2010-123298 extracted from the PAJ database on Jul. 9, 2014, 27 pages.
English language abstract for WO 2009/119037 extracted from espacenet.com database on Jul. 9, 2014, 1 page.
English language abstract and machine-assisted English translation for CN 101604776 extracted from espacenet.com database on Aug. 29, 2016, 10 pages.
English language abstract and machine-assisted English translation for CN 101728597 extracted from espacenet.com database on Aug. 29, 2016, 16 pages.
English language abstract and machine-assisted English translation for CN 101841072 extracted from espacenet.com database on Aug. 29, 2016, 15 pages.
English language abstract and machine-assisted English translation for JP 2011-116321 extracted from espacenet.com database on Aug. 29, 2016, 18 pages.

* cited by examiner

Fig.1
(a)
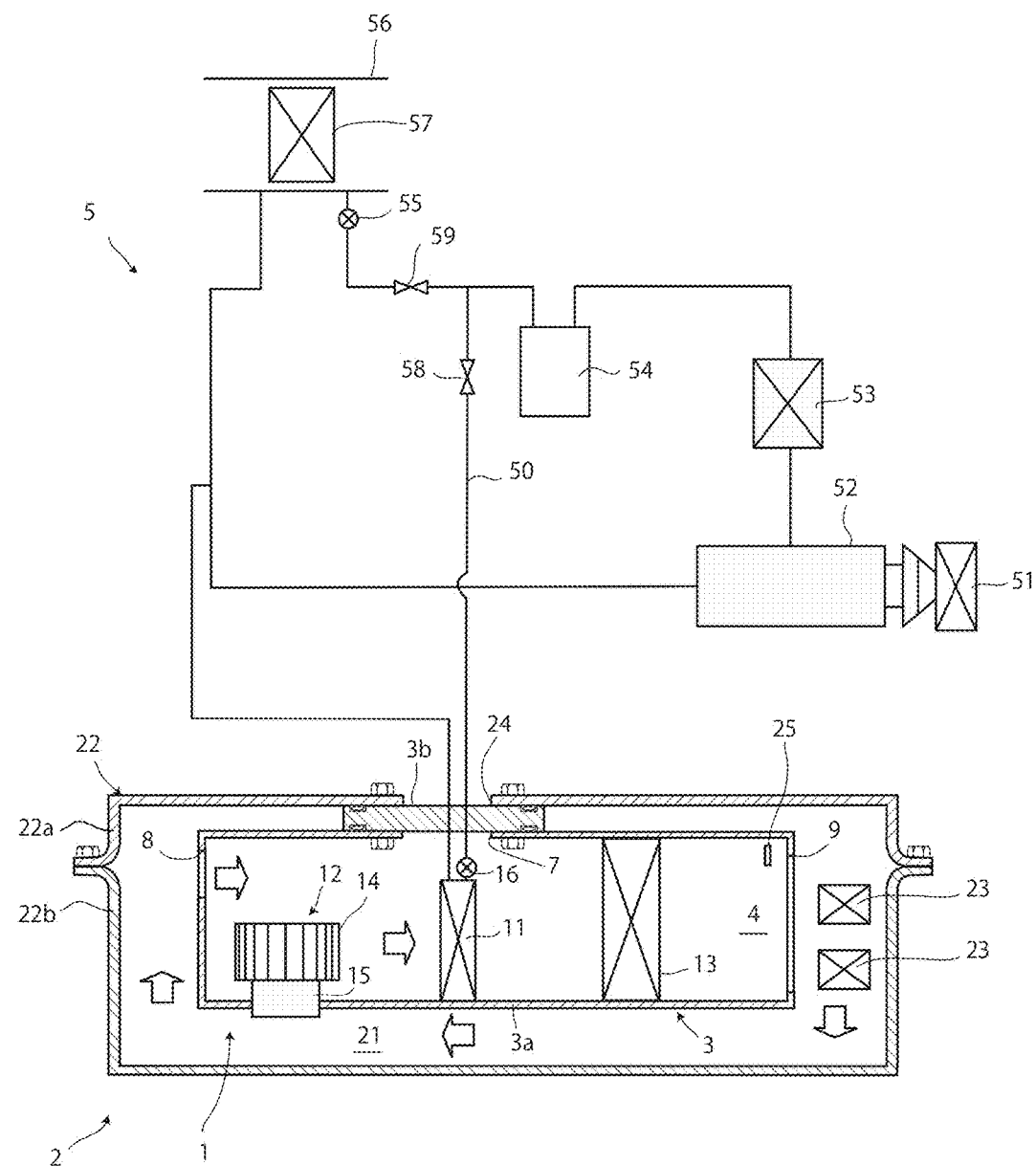
(b)
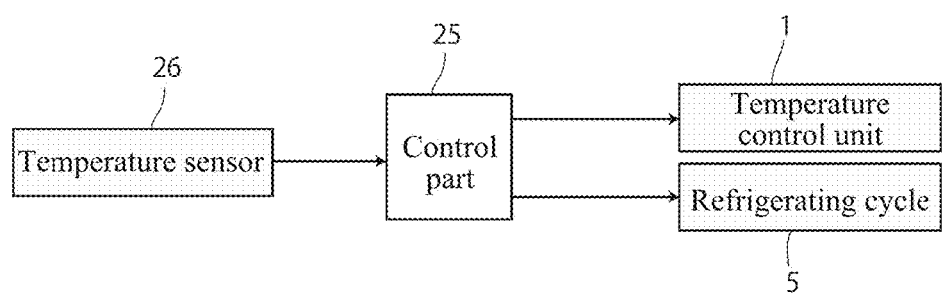

Fig.3
(a)
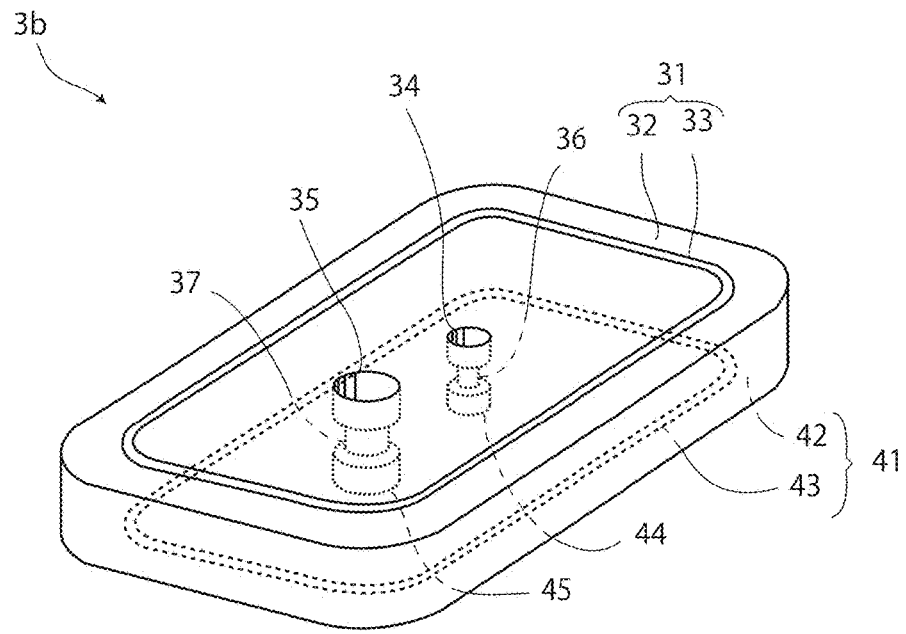
(b)
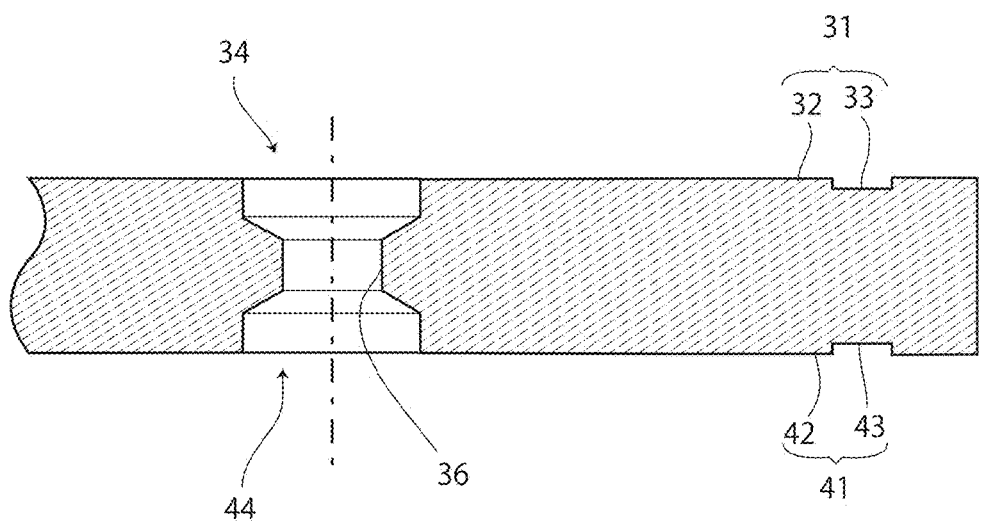

Fig.6
(a)
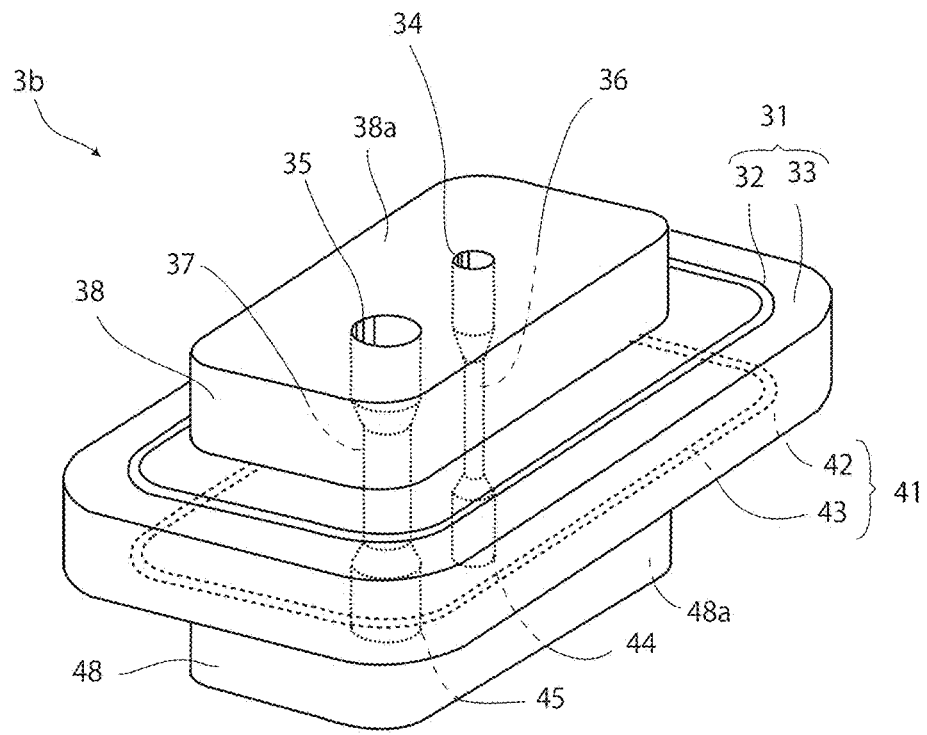
(b)
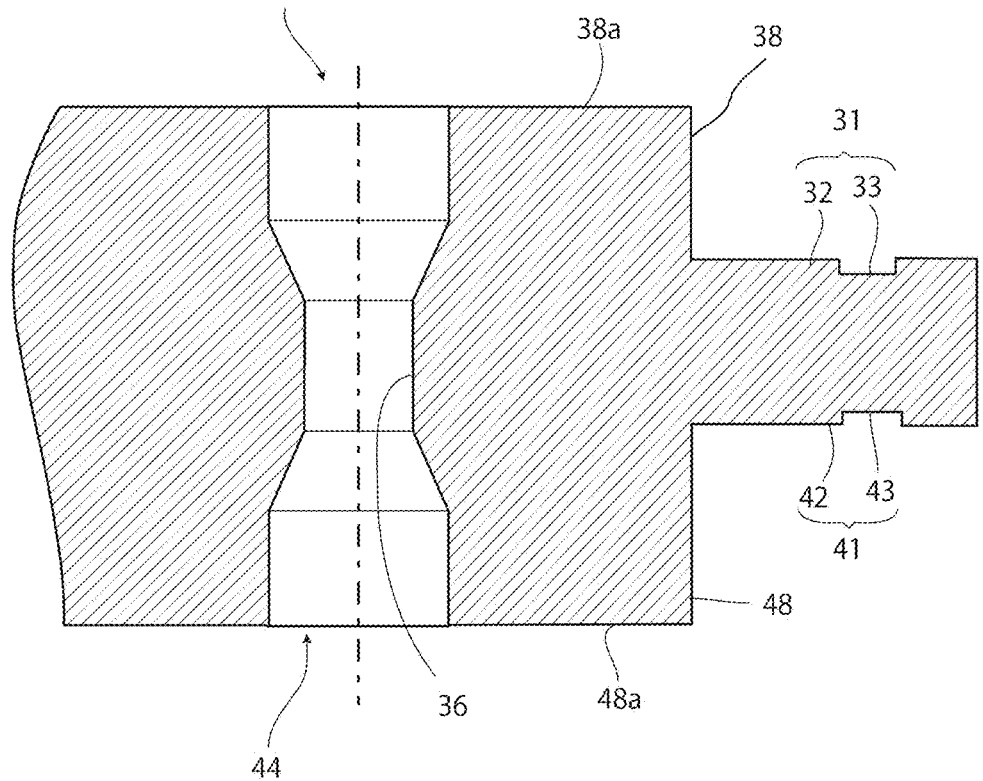

Fig. 11
(a)
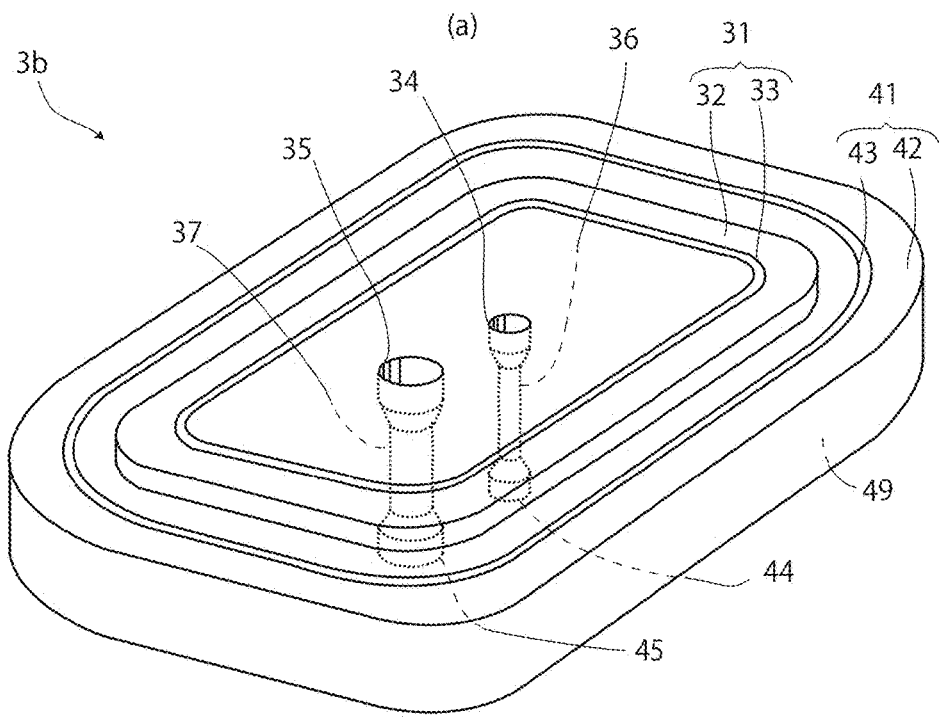
(b)
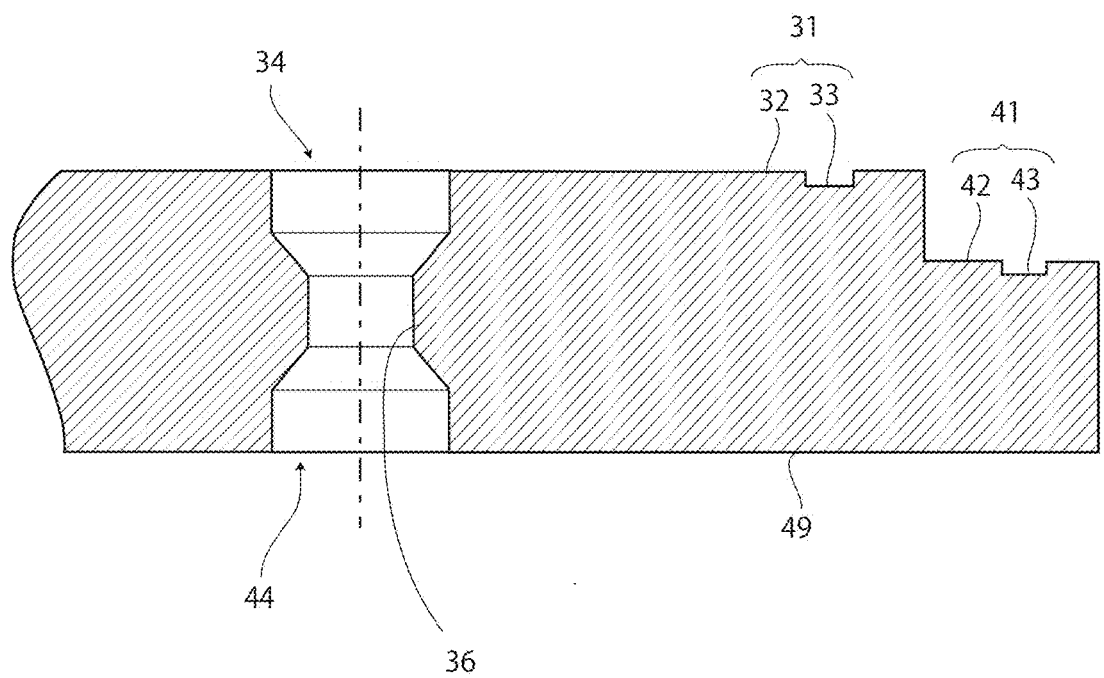

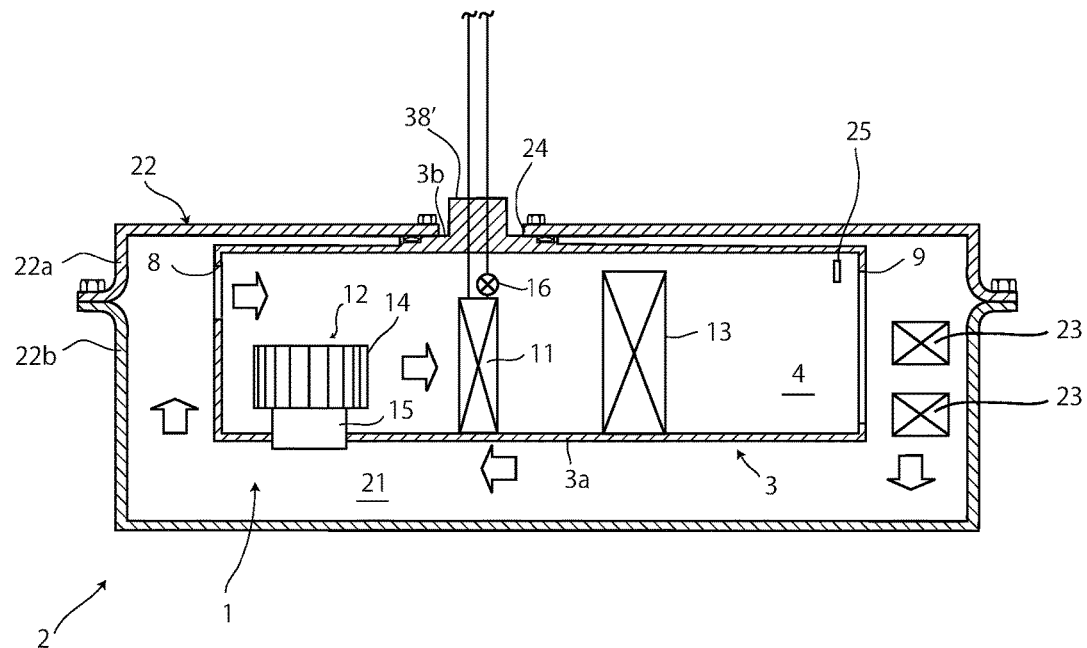
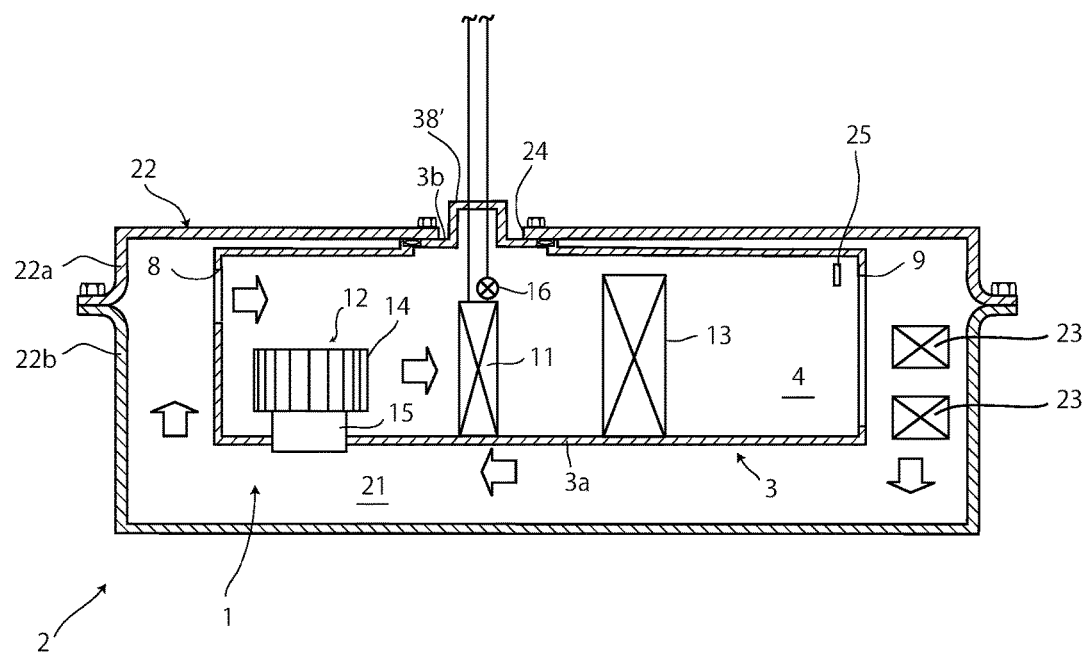

BATTERY TEMPERATURE CONTROL UNIT INCLUDING HEAT EXCHANGER ARRANGED IN AIR FLOW PASSAGE OF UNIT CASE

CROSS-REFERENCE TO RELATED APPLICATIONS

This application is the National Stage of International Patent Application No. PCT/JP2012/007573, filed on Nov. 26, 2012, which claims priority to and all the advantages of Japanese Patent Application No. JP2011-261153, filed on Nov. 30, 2011, the content of which incorporated herein by reference.

TECHNICAL FIELD

The present invention relates to a temperature control unit of a battery used for temperature control of a battery used in an electric vehicle or the like.

BACKGROUND ART

A battery for driving a vehicle mounted in an electric vehicle or a hybrid automobile is controlled at a predetermined temperature using a temperature control device such as a heat exchanger for optimizing a charge and discharge function of the battery.

It is often the case that a battery is mounted on a vehicle as a module configured including the above-mentioned temperature control device or the like. As a specific example of the battery mounting case, there has been known a battery cooling device which includes a case which defines a circulatable cooling passage; a battery which is partially or wholly exposed in the cooling passage; an evaporator which is arranged in the cooling passage; a refrigerant bypass passage which is connected to a compressor and a condenser of a refrigerating cycle of an air conditioning device, and is constituted of at least an expansion means and the evaporator; and a blower which is arranged in the cooling passage (see PTL 1).

There may be also a case where batteries are mounted on the vehicle in a state where a plurality of batteries are mounted in one module for obtaining a higher voltage. To be more specific, there has been known a battery cooling system for a vehicle where a plurality of battery packs which are arranged parallel to each other in the horizontal direction are accommodated in a battery box, and the battery packs are cooled by cooling air flown into the battery box, wherein air ducts which spray cooling air to the battery packs are incorporated in the battery box, and the air ducts are arranged parallel to the battery packs in the horizontal direction (see PTL 2).

CITATION LIST

Patent Literature

PTL 1: JP-A-2002-313441
PTL 2: JP-A-2010-123298

SUMMARY OF INVENTION

Technical Problem

However, in the battery cooling devices described in the above-mentioned PTL 1 and PTL 2, steps for assembling the blower, the heat exchanger and the like into a module case become necessary and hence, the number of assembling steps is increased whereby the operation becomes cumbersome.

To simplify the above-mentioned assembling steps, for example, as shown in FIG. 23, it is considered that a temperature control unit 200 into which a blower 201, an evaporator 202 and a heater core 203 are assembled in advance may be assembled into a module case 100.

An opening portion 104 in which a refrigerant passage 205 for supplying a refrigerant to the evaporator 202 is arranged is formed in the module case 100. To prevent the generation of rusts and short-circuiting in the inside of the module, the opening portion 104 is closed by a sealing member 105 having waterproof property to an extent that the movement of moisture between the outside and the inside of the module case 100 can be prevented.

The sealing member 105 includes, to be more specific, a connecting portion 208 which is connected to a refrigerant passage 205 for supplying a refrigerant to the evaporator 202, and a sealing material is, although not shown in the drawing, provided between the connecting portion 208 and the refrigerant passage 205 for preventing a leakage of the refrigerant.

Further, an opening portion 206 in which the refrigerant passage 205 is arranged is formed also in a unit case 204 of the temperature control unit 200. The opening portion 206 is also closed by a sealing member 207 for preventing a large quantity of supplied air in the temperature control unit 200 from being leaked from the unit case 204 and for enabling the supply of air at a proper temperature.

In this manner, forming of the opening portion 104 in the module case 100 and forming of the opening portion 206 in the temperature control unit 200 require steps of closing the opening portion 104 and the opening portion 206 using the sealing members 105, 207 possessing water tightness and gas tightness respectively. Accordingly, the conventional battery case has a drawback that the number of parts and the number of steps are increased.

The present invention has been made in view of the above-mentioned drawbacks, and it is a main object of the present invention to provide a battery temperature control unit which can control a temperature of an internal space of a module case which accommodates a battery, wherein water tightness which a sealing member of the module case is required to possess and gas tightness of a unit case of the battery temperature control unit can be ensured and, at the same time, assembling steps can be simplified.

Solution to Problem

A battery temperature control unit according to the invention is a battery temperature control unit for controlling a temperature of an internal space of a battery module where a battery is arranged in the internal space of a module case. The battery temperature control unit includes: a unit case which includes an air flow passage in the inside thereof and is arranged in the internal space; and a heat exchanger arranged in the air flow passage. The unit case includes a module opening sealing portion which seals a module opening formed in a wall surface of the module case. The module opening sealing portion includes: a module sealing surface which closes the module opening from an internal space side; a first communication hole which allows the outside and the inside of the unit case to communicate with each other and through which a heating medium which is directed toward the inside of the unit case from the outside of the module case flows; and a second communication hole which allows the outside and the inside of the unit case to communicate with each other and through which a heating medium which is directed toward the outside of the module case from the inside of the unit case flows (claim 1).

With such a battery temperature control unit, it is possible to allow a heating medium to flow from the outside to the inside of the unit case as well as from the inside to the outside of the unit case while ensuring gas tightness of the air flow passage in the unit case and, at the same time, the module opening can be sealed by assembling the battery temperature control unit into the module case thus also ensuring water tightness of the module case.

The unit case is constituted of a unit case body having the air flow passage in the inside thereof and a sealing member, wherein the sealing member includes the module opening sealing portion and a unit opening sealing portion which closes a unit opening formed in a wall surface of the unit case body (claim 2).

By forming the unit case and the sealing member as separate bodies, the unit case and the sealing member can be manufactured using materials and steps appropriate for the respective parts thus enhancing quality and productivity of the unit case and the sealing member.

The module opening sealing portion may include a projecting portion which is formed in a projecting manner in the direction toward the outside of the unit case from an inner side of the module sealing surface in the surface direction and having a cross-sectional shape smaller than a cross-sectional shape of the module opening, and the first communication hole and the second communication hole may be formed so as to make a top surface of the projecting portion and a surface of the module opening sealing portion which faces the inside of the unit case communicate with each other (claim 3).

In assembling the battery temperature control unit into the module case, the module sealing surface and the projecting portion are fitted into the module opening and hence, the positioning of the battery temperature control unit can be facilitated.

The unit opening sealing portion may include a second projecting portion which is formed in a projecting manner in the direction toward the inside of the unit case from an inner side of the unit sealing surface in the surface direction and having a cross-sectional shape smaller than a cross-sectional shape of the unit opening, and the first communication hole and the second communication hole may be formed so as to make a surface of the module opening sealing portion which faces the outside of the unit case and a top surface of the second projecting portion communicate with each other (claim 4).

In assembling the sealing member into the unit opening, the unit sealing surface and the second projecting portion are fitted into the unit opening and hence, the positioning of the sealing member can be facilitated.

The unit opening sealing portion may include a unit sealing surface which closes the unit opening from the outside of the unit cases (claim 5).

In assembling the battery temperature control unit into the module case, the battery temperature control unit can be assembled such that the module sealing surface and the unit sealing surface of the sealing member are sandwiched between a wall surface of the module case on an internal space side and a wall surface of the unit case on an outer side and hence, water tightness of the module case can be ensured more reliably.

The unit opening sealing portion may include a unit sealing surface which closes the unit opening from the inside of the unit case (claim 6).

By arranging the battery temperature control unit closer to the module case, the degree of freedom in designing can be enhanced.

The module opening sealing portion may be integrally formed with the unit case (claim 7).

The sealing member can be eliminated and hence, the battery temperature control unit can be arranged close to the module case compared to the constitution called for in claim 6 whereby the degree of freedom in designing can be enhanced.

The heat exchanger may be a cooler or a heater (claim 8).

Advantageous Effects of Invention

According to the present invention described above, it is possible to decrease the number of the parts and to simplify assembling steps while ensuring water tightness which a sealing member of a module case is required to possess and gas tightness of a unit case of a battery temperature control unit.

BRIEF DESCRIPTION OF DRAWINGS

FIG. 1(a) is a cross-sectional view showing the whole constitution of a battery module according to an embodiment 1, and FIG. 1(b) is a block diagram showing inputting of signals to a control part and outputting of signals from the control part.

FIG. 3(a) is a perspective view of the sealing member, and FIG. 3(b) is a cross-sectional view of a part the sealing member.

FIG. 6(a) and FIG. 6(b) are views showing a sealing member according to the embodiment 2, wherein FIG. 6(a) is a perspective view, and FIG. 6(b) is a cross-sectional view of a part of the sealing member.

FIG. 11(a) and FIG. 11(b) are views showing a sealing member according to the embodiment 3, wherein FIG. 11(a) is a perspective view, and FIG. 11(b) is a cross-sectional view of a part of the sealing member.

FIG. 15(a) and FIG. 15(b) are views showing a unit case according to the embodiment 4, wherein FIG. 15(a) is a perspective view, and FIG. 15(b) is a cross-sectional view of a part of the unit case.

FIG. 16 is a cross-sectional view showing the whole constitution of another example of the battery module according to the embodiment 4.

FIG. 17 is a cross-sectional view showing the whole constitution of another example of the battery module according to the embodiment 4.

DESCRIPTION OF EMBODIMENTS

Figure 2:
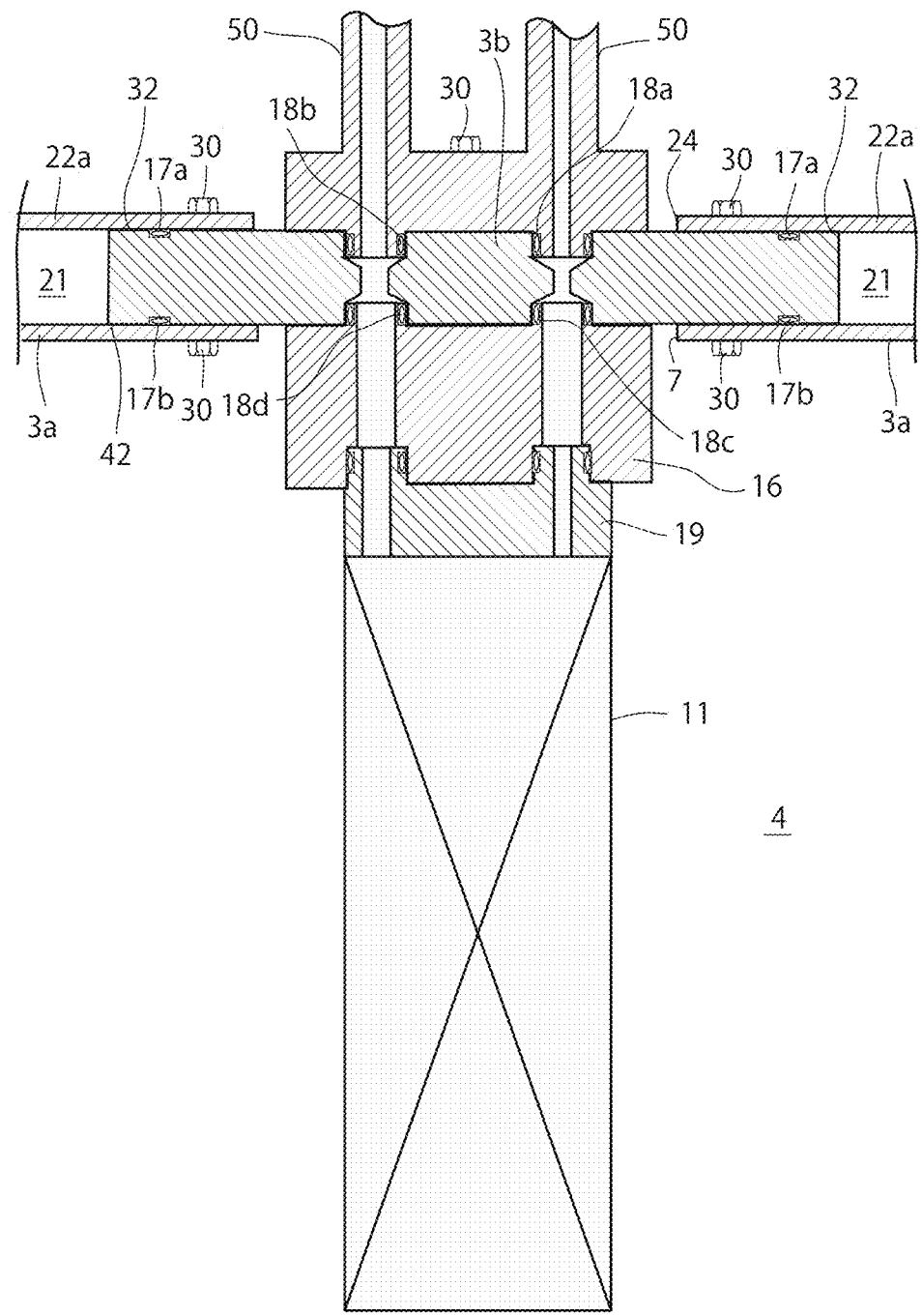
FIG. 2 is an enlarged cross-sectional view showing a mounting state of a sealing member.

Hereinafter, a battery temperature control unit of the present invention is explained by reference to the drawings.

Embodiment 1

As shown in FIG. 1(a), a battery temperature control unit 1 is a unit for controlling a temperature in an internal space 21 of a battery module 2 which supplies electricity to a drive motor of an electric vehicle, a hybrid vehicle or the like. The battery module 2 is configured such that batteries 23 and the battery temperature control unit 1 are arranged in a module case 22.

The module case 22 of the battery module 2 is made of metal such as aluminum and is formed into a hollow box having an approximately rectangular shape. A module opening 24 is formed in any one of an upper surface, a side surface and a bottom surface of the module case 22. The module case 22 is constituted of a lid member 22a and a box member 22b. Various parts are arranged in the internal space 21 of the module case 22 such that the batteries 23, the battery temperature control unit 1, various kinds of electric wires and the like are arranged in the box member 22b and, thereafter, the box member 22b is closed by the lid member 22a.

In this embodiment, the batteries 23 are formed in a rectangular thin plate shape, and are fixed to the module case 22. As a shape of the batteries 23, a columnar shape or the like may be adopted besides the rectangular thin plate shape. However, the shape of the batteries 23 is not particularly limited.

The battery temperature control unit 1 is configured such that at least an evaporator (heat exchanger for cooling) 11 is arranged in an air flow passage 4 formed in the inside of a unit case 3. A blower 12 which supplies air to the inside of the air flow passage 4 and a heater core 13 (heat exchanger for heating) are also added when necessary.

The unit case 3 is made of a resin such as polypropylene and is formed of a hollow box having a rectangular shape. The unit case 3 is constituted of a unit case body 3a in which the air flow passage 4 is formed, and a sealing member 3b described later.

A unit opening 7, a suction hole 8 and a blow-off hole 9 are formed in the unit case body 3a. The unit opening 7 opens in the same direction as the module opening 24 formed in the module case 22 (opening on an upper surface of the unit case body 3a in the drawing). The suction hole 8 opens in a side surface of the unit case body 3a on one end in the longitudinal direction for taking supplied air into the unit case body 3a. The blow-off hole 9 opens in a side surface of the unit case body 3a on the other end in the longitudinal direction, and blows off air from the unit case body 3a. The above-mentioned air flow passage 4 is formed by the unit case body 3a and the sealing member 3b.

The blower 12 is constituted of an impeller 14 which supplies air sucked from the axial direction in the radially outward direction, and a drive motor 15 which rotates the impeller 14. The blower 12 discharges air sucked through the suction hole 8 from the blow-off hole 9.

In this embodiment, the heater core 13 is an electric heater core which heats air after air passes through the evaporator 11. The heater core 13 is constituted of a plurality of heat generating elements not shown in the drawing, and a plurality of heat radiation fins arranged between the heat generation elements in the laminating direction of the heat generation elements. Although not shown in the drawing, the heater core 13 may be formed of a known hot-water heater core.

The evaporator 11 includes heat radiations fins such as corrugated fins. In this embodiment, the evaporator 11 cools air due to evaporation of a refrigerant. The evaporator 11 is connected to a refrigerating cycle 5 of a vehicle-use air conditioner through refrigerant pipes 50 which bypass a part of the refrigerating cycle 5. An expansion device (for example, a mechanical expansion valve, an electric expansion valve where valve opening is variable corresponding to an external signal, or an orifice tube) 16 is mounted on the refrigerant pipes 50 upstream of the evaporator 11. In this embodiment, the refrigerating cycle 5 is constituted of: a compressor 52 which is connected to and is driven by an engine for traveling or the like not shown in the drawing by way of an electromagnetic clutch 51; a condenser 53 which condenses a refrigerant compressed by the compressor 52; a liquid tank 54 which separates a gaseous refrigerant and a liquid refrigerant from a refrigerant which is condensed by the condenser 53 and is brought into a state where the gaseous refrigerant and the liquid refrigerant are mixed together; an expansion device for air conditioning (for example, a mechanical expansion valve, an electric expansion valve where the valve opening is variable corresponding to an external signal, an orifice tube or the like) 55 which lowers a pressure of a liquid refrigerant by expanding the liquid refrigerant; and an evaporator for air conditioning 57 which evaporates the refrigerant whose pressure is lowered by the expansion device for air conditioning 55 thus cooling air which passes through an air conditioning duct 56. The refrigerant pipes 50 are connected to the expansion device for air conditioning 55 and the air conditioning evaporator 57 parallel to each other. The compressor 52 may be formed of an electrically-operated compressor which does not include an electromagnetic clutch. The refrigerating cycle 5 may be a dedicated passage which does not include an air conditioning refrigerant passage and supplies a refrigerant only to the battery temperature control unit.

A first open/close valve 58 which opens or closes the refrigerant pipes 50 is mounted on the refrigerant pipes 50. A second open/close valve 59 which allows or shuts off the flow of a refrigerant toward the expansion device for air conditioning 55 is arranged between the expansion device for air conditioning 55 and a branch point of the refrigerant pipes 50. Due to such a constitution, when cooling is desired by operating only the vehicle-use air conditioner, the compressor 52 is operated in a state where the first open/close valve 58 is closed and the second open/close valve 59 is opened. When an operation of the evaporator 11 is also desired at the time of cooling by operating the vehicle-use air conditioner, the compressor 52 is operated in a state where the first open/close valve 58 is opened and the second open/close valve 59 is also opened. Further, when the operation of only the evaporator 11 is desired although cooling of a cabin using the vehicle-use air conditioner is unnecessary, the compressor 52 is operated in a state where the first open/close valve 58 is opened and the second open/close valve 59 is closed. By replacing the expansion device 16 and the expansion device for air conditioning 55 with an electric expansion device which can perform a valve opening variable control and closing of the valve, opening and closing of the refrigerant passage can be also performed arbitrarily and hence, the open/close valves 58, 59 can be eliminated.

Although not shown in the drawing, the evaporator 11 may be of a type where cold water or a cooled coolant or the like is used as a heating medium in place of a refrigerant.

The module opening 24 of the module case 22 and the unit opening 7 of the unit case body 3*a* are closed by the sealing member 3*b* so that the module case 22 and the unit case body 3*a* are sealed in such a manner that water tightness or gas tightness is ensured.

The sealing member 3*b* is made of metal such as aluminum. As shown in FIG. 2 and FIG. 3, the sealing member 3*b* is constituted of: a module opening sealing portion 31 which seals the internal space 21 by closing the module opening 24 formed in the wall surface of the module case 22; and a unit opening sealing portion 41 which seals the air flow passage 4 by closing the unit opening 7 formed in the wall surface of the unit case body 3*a*. The sealing member 3*b* is fixed to the unit case body 3*a* by fixing bolts 30.

The module opening sealing portion 31 includes a module sealing surface 32 which is formed into a planar shape so as to be brought into contact with the module opening 24 and closes the module opening 24 from an internal space 21 side. A groove 33 which accommodates a sealing material 17*a* therein is formed on the module sealing surface 32 for preventing the intrusion of water from the outside.

The unit opening sealing portion 41 includes a unit sealing surface 42 which is formed into a planar shape so as to be brought into contact with the unit opening 7 and closes the unit opening 7 from the outside of the unit case. A groove 43 which accommodates a sealing material 17*b* therein is formed on the unit sealing surface 42 for ensuring the gas tightness of the unit case body 3*a*. The groove 43 is formed in the direction opposite to the groove 33.

On the module sealing surface 32, an outer high-pressure pipe connecting portion 34 and an outer low-pressure pipe connecting portion 35, which are connected to the refrigerant pipes 50, are formed. On the unit sealing surface 42, an inner high-pressure pipe connecting portion 44 and an inner low-pressure pipe connecting portion 45 which are connected to the expansion device 16 are formed. The outer high-pressure pipe connecting portion 34 and the inner high-pressure pipe connecting portion 44 are communicated with each other through a first communication hole 36, and the outer low-pressure pipe connecting portion 35 and the inner low-pressure pipe connecting portion 45 are communicated with each other through a second communication hole 37.

The outer high-pressure pipe connecting portion 34 and the outer low-pressure pipe connecting portion 35 are formed such that connecting portions of the refrigerant pipe 50 can be inserted into the outer high-pressure pipe connecting portion 34 and the outer low-pressure pipe connecting portion 35 respectively, and a leakage of a refrigerant is prevented by sealing materials 18*a*, 18*b* such as O-rings mounted on the refrigerant pipes 50. Here, the refrigerant pipes 50 and the sealing member 3*b* are connected to each other by the well-known constitution such as the fixing using fixing bolts 30 as shown in FIG. 2, for example.

In the same manner as the outer high-pressure pipe connecting portion 34 and the outer low-pressure pipe connecting portion 35, the inner high-pressure pipe connecting portion 44 and the inner low-pressure pipe connecting portion 45 are also formed such that a connecting portion of the expansion device 16 on a sealing member 3*b* side can be inserted into the inner high-pressure pipe connecting portion 44 and the inner low-pressure pipe connecting portion 45. A leakage of a refrigerant is prevented by sealing materials 18*c*, 18*d* such as O-rings mounted on the connecting portions. The expansion device 16 and the evaporator 11 are connected with each other such that a refrigerant from the expansion device 16 is supplied to the evaporator 11 through the connection member 19. The connection between the expansion device 16 and the evaporator 11 may be arbitrarily designed such that the expansion device 16 and the evaporator 11 are directly connected with each other without interposing the connection member 19 therebetween, or the expansion device 16 and the evaporator 11 are connected with each other in accordance with a layout by using pipes or the like as a substitute for the connection member 19.

After the battery temperature control unit 1 is assembled into the module case 22, the module case 22 and the sealing member 3*b* are fixed to each other using the fixing bolts 30.

By setting a total combined size of a size of the unit case body 3*a* and a size of the sealing member 3*b* slightly larger than a size of the module case 22 in the vertical direction in advance, the unit case body 3*a* and the module case 22 can be assembled to each other while clamping the sealing member 3*b* between the module case 22 and the unit case body 3*a* with a clamping stress and hence, the water tightness of the internal space of the module case 22 and the gas tightness of the unit case body 3*a* can be surely acquired.

Next, the manner of operation of the battery module 2 which mounts the battery temperature control unit 1 thereon is explained.

An operation control of the above-mentioned battery module 2 may be part of air conditioning control performed by a control part 25 which is mounted on the vehicle and performs an air conditioning control.

FIG. 1(*b*) is a block diagram showing inputting of signals to the control part 25 and outputting of signals from the control part 25. The control part 25 which constitutes a control means for performing various controls is mounted on the battery module 2. The control part 25 is constituted of a well-known microcomputer which includes a CPU, a ROM, a RAM and the like and a peripheral circuit arranged around the microcomputer. Sensor signals from the various sensors and the like are inputted to the control part 25. At least a signal is inputted to the control part 25 from a temperature sensor 26 which detects a temperature in the inside of the module case 22. The control part 25 outputs control signals to the refrigerating cycle 5, the battery temperature control unit 1 and the like based on the result of calculation. In this embodiment, the control of the battery module 2 and the air conditioning control are performed using the same control part 25. However, it may be possible that the control of the battery module 2 and the air conditioning control may use the individually different control parts and the communication is performed between these control parts.

As has been explained heretofore, the module opening 24 and the unit opening 7, which are formed in the module case 22 and the unit case body 3a such that the module opening 24 and the unit opening 7 each form an opening and are aligned with each other are closed by the sealing member 3b simultaneously. Accordingly, while ensuring the water tightness and the gas tightness of a refrigerant which the module case 22 is required to possess and the gas tightness in the inside of the unit case body 3a, it is possible to decrease the number of parts and to simplify assembling steps.

By forming the unit case body 3a and the sealing member 3b as separate bodies, the unit case body 3a and the sealing member 3b can be manufactured using materials and steps appropriate for the respective parts thus enhancing quality and productivity of the unit case body 3a and the sealing member 3b.

Embodiment 2

In the embodiment 1, the sealing member 3b is constituted of the module sealing surface 32 and the unit sealing surface 42. However, the sealing member 3b may be constituted such that a projecting portion which projects in the direction toward the outside of the unit case is formed on the module sealing surface 32, and a projecting portion which projects in the direction toward the inside of the unit case is formed on the unit sealing surface 42.

Figure 4:
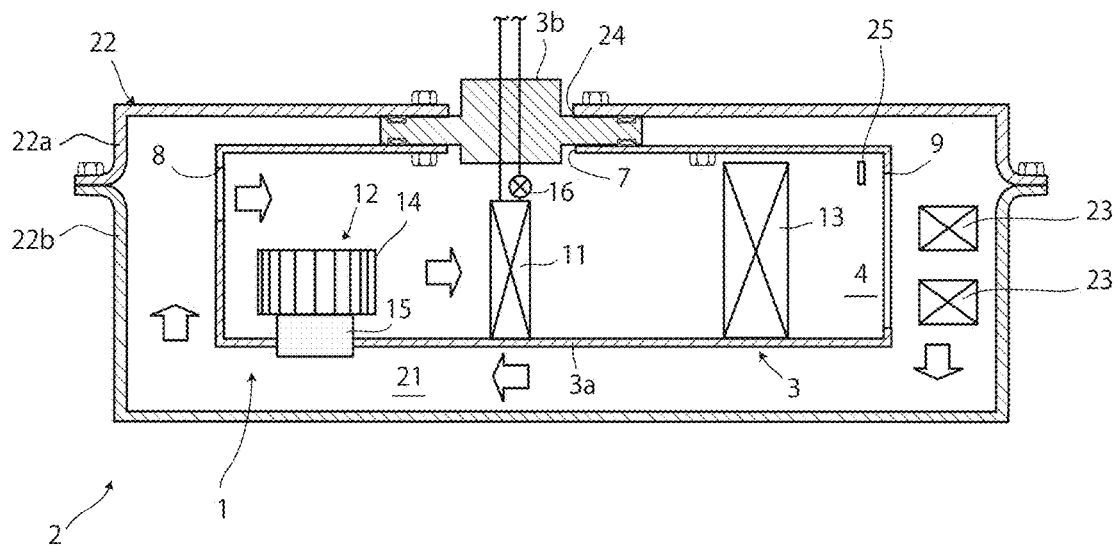
FIG. 4 is a cross-sectional view showing the whole constitution of a battery module according to an embodiment 2.
Figure 5:
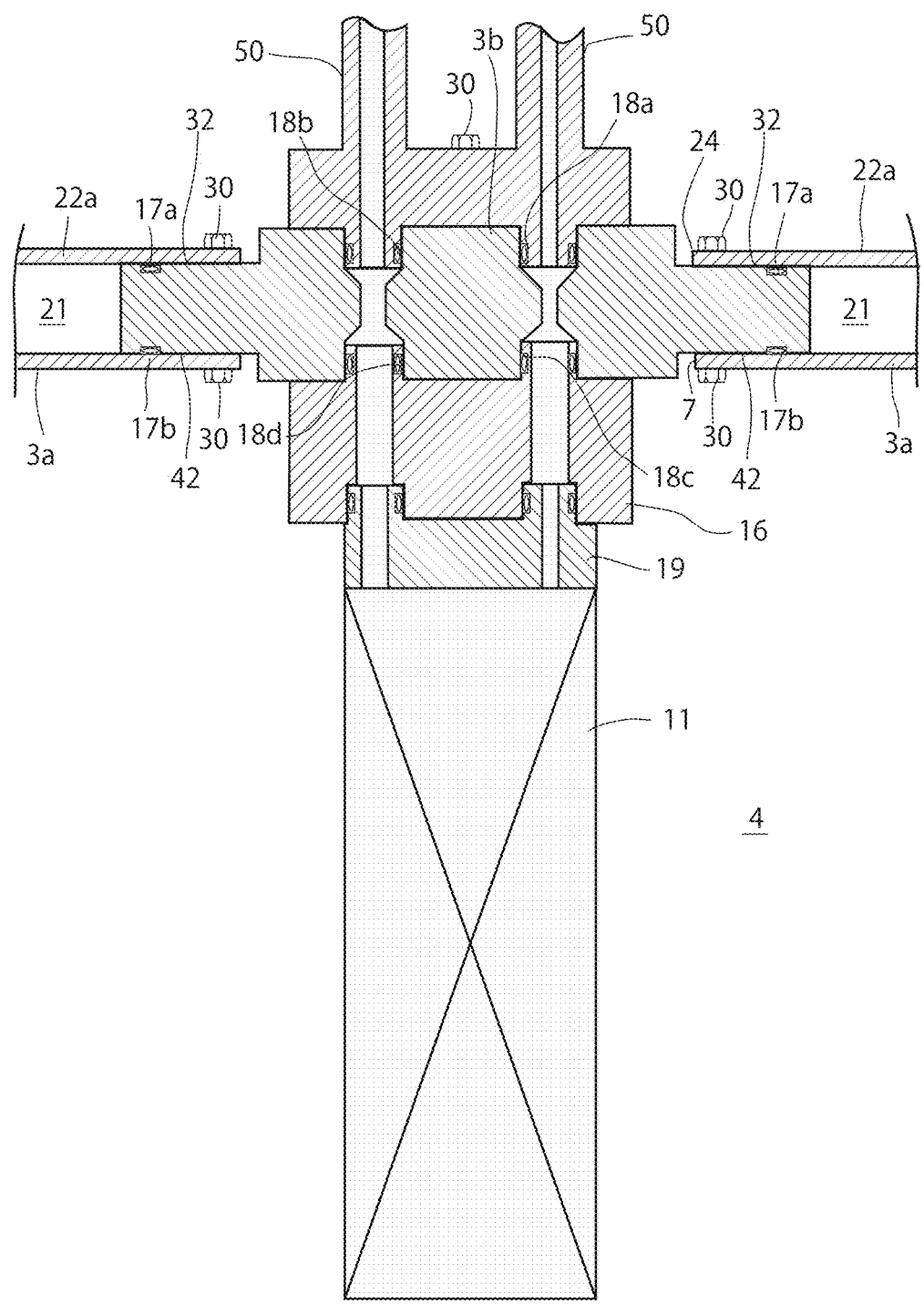
FIG. 5 is an enlarged cross-sectional view showing a mounting state of a sealing member.

As shown in FIG. 4 to FIG. 6, on the sealing member 3b, a first projecting portion 38 which projects in the direction toward the outside the unit case from an inner side of the module sealing surface 32 in the surface direction is formed, and a second projecting portion 48 which projects in the direction toward the inside of the unit case from an inner side of a unit sealing surface 42 in the surface direction is formed.

The first projecting portion 38 is formed such that a cross-sectional shape of the first projecting portion 38 is smaller than that of a module opening 24 so that the first projecting portion 38 projects to the outside a module case 22 when the module sealing surface 32 seals the module opening 24 from an internal space 21 side.

The second projecting portion 48 is formed such that a cross-sectional shape of the second projecting portion 48 is smaller than that of the unit opening 7 so that the second projecting portion 48 projects to an air flow passage 4 of the unit case 3 when the unit sealing surface 42 seals the unit opening 7 from an internal space 21 side.

Further, on a top surface 38a of the first projecting portion 38 (on an end surface of a distal end of the first projecting portion 38 in the projecting direction), an outer high-pressure pipe connecting portion 34 and an outer low-pressure pipe connecting portion 35 which are connected to refrigerant pipes 50 are formed. On a top surface 48a of the second projecting portion 48 (an end surface of a distal end of the second projecting portion 48 in the projecting direction), an inner high-pressure pipe connecting portion 44 and an inner low-pressure pipe connecting portion 45 which are connected to an expansion device 16 are formed. In the same manner as the embodiment 1, the outer high-pressure pipe connecting portion 34 and the inner high-pressure pipe connecting portion 44 are communicated with each other through a first communication hole 36, and the outer low-pressure pipe connecting portion 35 and the inner low-pressure pipe connecting portion 45 are communicated with each other through a second communication hole 37.

The embodiment 2 is equal to the above-mentioned embodiment with respect to other constitutions and hence, parts identical with the parts of the above-mentioned embodiment are given the same symbols and explanation of these parts is omitted.

As described above, by forming the first projecting portion 38 on the sealing member 3b, when the battery temperature control unit 1 is assembled into the module case 22, the module sealing surface 32 and the first projecting portion 38 are fitted into the module opening 24 and hence, the positioning of the battery temperature control unit 1 can be facilitated. Further, by forming the second projecting portion 48 on the sealing member 3b, when the sealing member 3b is assembled into the unit opening 7, the unit sealing surface 42 and the second projecting portion 48 are fitted into the unit opening 7 and hence, the positioning of the sealing member 3b can be facilitated.

Figure 7:
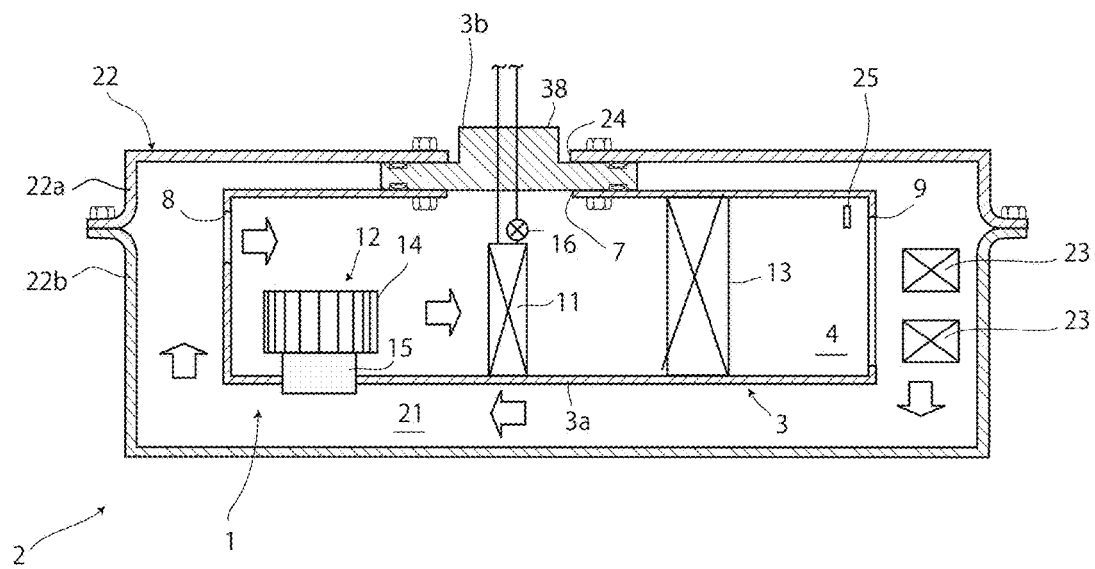
FIG. 7 is a cross-sectional view showing the whole constitution of another example of the battery module according to the embodiment 2.
Figure 8:
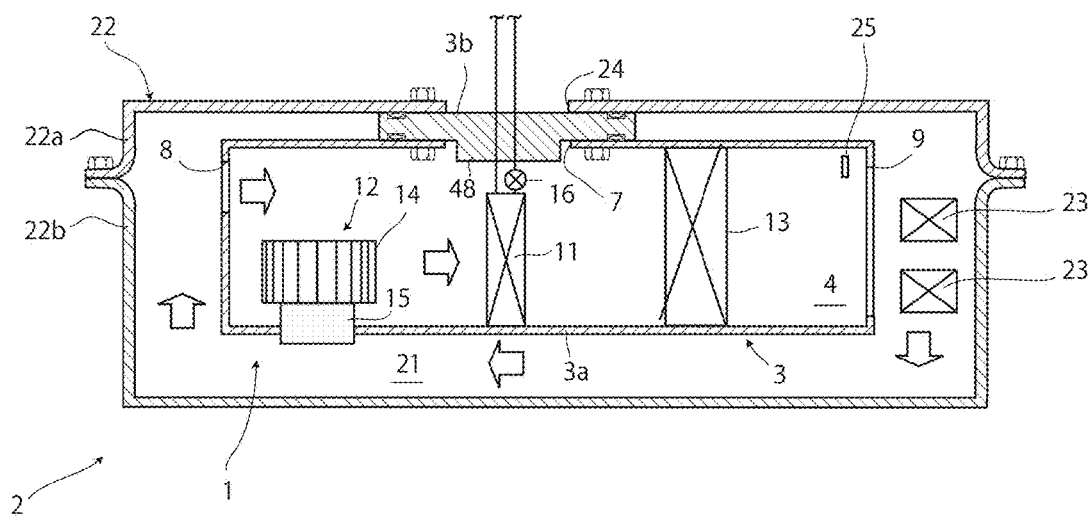
FIG. 8 is a cross-sectional view showing the whole constitution of another example of the battery module according to the embodiment 2.

In this embodiment, the sealing member 3b is formed to include both the first projecting portion 38 and the second projecting portion 48. However, as shown in FIG. 7, the sealing member 3b may be formed to include only the first projecting portion 38 or, as shown in FIG. 8, the sealing member 3b may be formed to include only the second projecting portion 48.

Embodiment 3

In the above-mentioned embodiment, the sealing member 3b is formed such that the sealing member 3b closes the unit opening 7 from the outside the unit opening 7. However, the unit opening 7 may be closed by the sealing member 3b from the inside the unit case 3.

Figure 9:
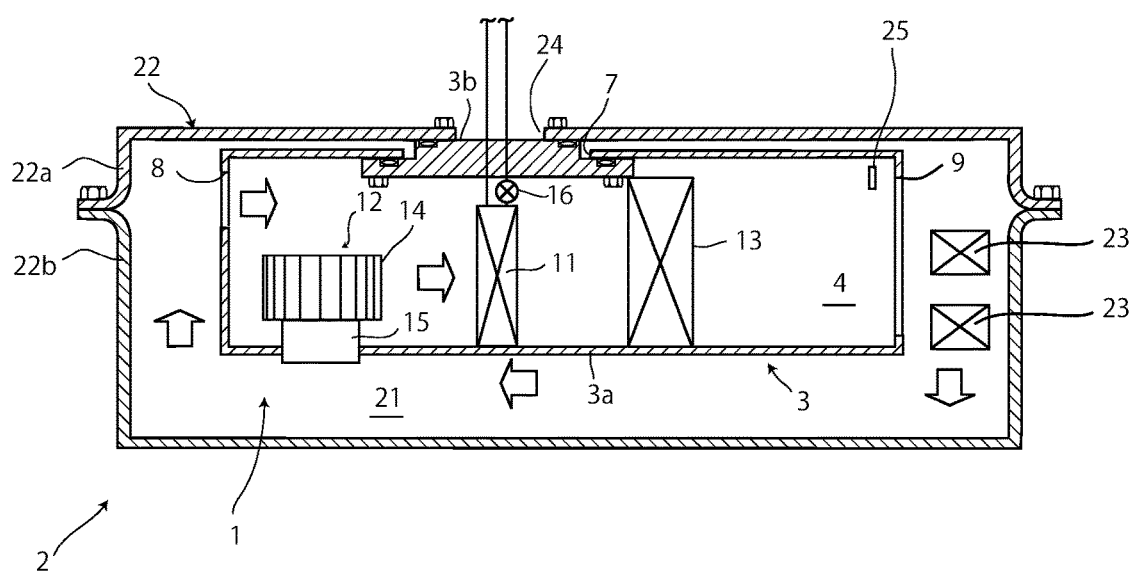
FIG. 9 is a cross-sectional view showing the whole constitution of a battery module according to an embodiment 3.
Figure 10:
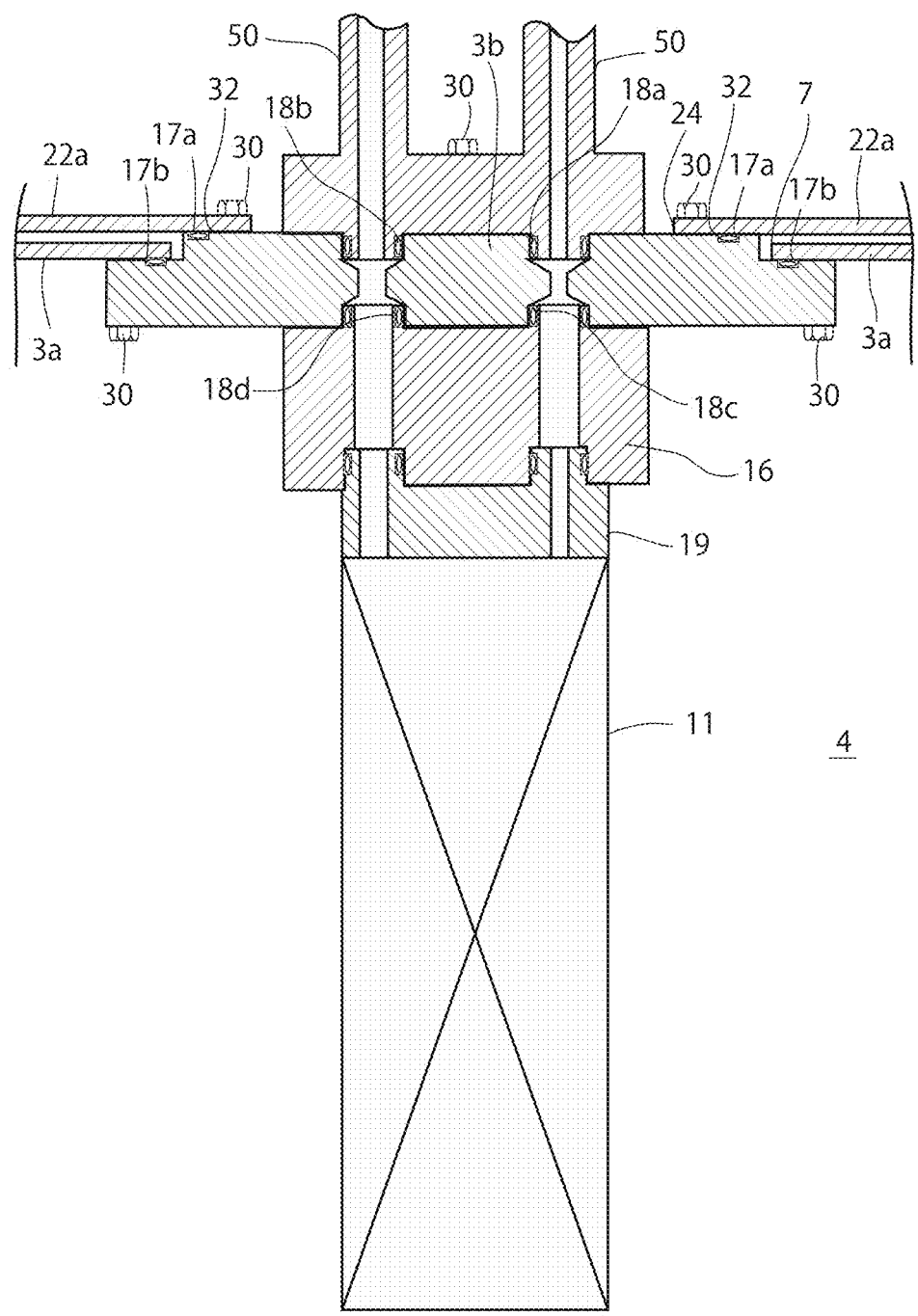
FIG. 10 is an enlarged cross-sectional view showing a mounting state of a sealing member.

To be more specific, as shown in FIG. 9 to FIG. 11, a module sealing surface 32 is formed on a sealing member 3b in a projecting manner in the direction toward the outside a unit case 3 from a portion of the sealing member 3b on a unit sealing surface 42 side. That is, the module sealing surface 32 is formed in a projecting manner in the direction toward the outside of the unit case 3 when the unit sealing surface 42 seals the unit opening 7 from an air flow passage 4 side. The module sealing surface 32 is formed to have a cross-sectional shape larger than that of the module opening 24 so as to enable the sealing of the module opening 24.

A groove 43 which accommodates a sealing material 17b therein for ensuring the gas tightness of a unit case body 3a is formed on the unit sealing surface 42 in the same direction as a groove 33.

The sealing member 3b is fixed to a module case 22 and a unit case body 3a using fixing bolts 30 so as to seal both openings 24, 7 from the inside the openings 24, 7.

A first communication hole 36 and a second communication hole 37 are respectively formed so as to make the module sealing surface 32 and a surface 49 of the sealing member 3b which faces the inside the unit case 3 communicate with each other.

As described above, by sealing the unit opening 7 by the unit sealing surface 42 from the inside the unit opening 7, it is unnecessary to form the grooves 33, 43 on front and back surfaces of the sealing member 3b and hence, a thickness of the sealing member 3b can be reduced. Accordingly, compared to the embodiment 1, the battery temperature control unit 1 can be arranged closer to the module case 22 thus enhancing the degree of freedom in designing.

Figure 12:
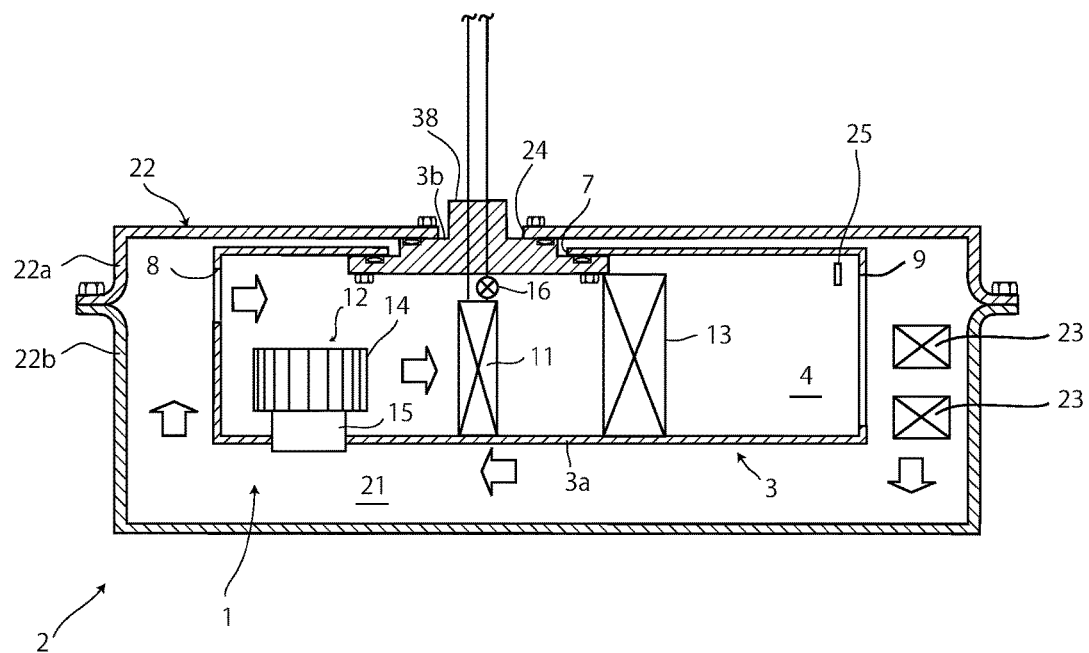
FIG. 12 is a cross-sectional view showing the whole constitution of another example of the battery module according to the embodiment 3.

As shown in FIG. 12, to facilitate the positioning between the sealing member 3b and the module opening 24, a first projecting portion 38 which projects in the direction toward the outside of the unit case may be formed on the module sealing surface 32.

Embodiment 4

In the above-mentioned embodiment, the module opening sealing portion 31 is formed on the sealing member 3b. However, the module opening sealing portion 31 may be formed as an integral part of the unit case 3.

Figure 13:
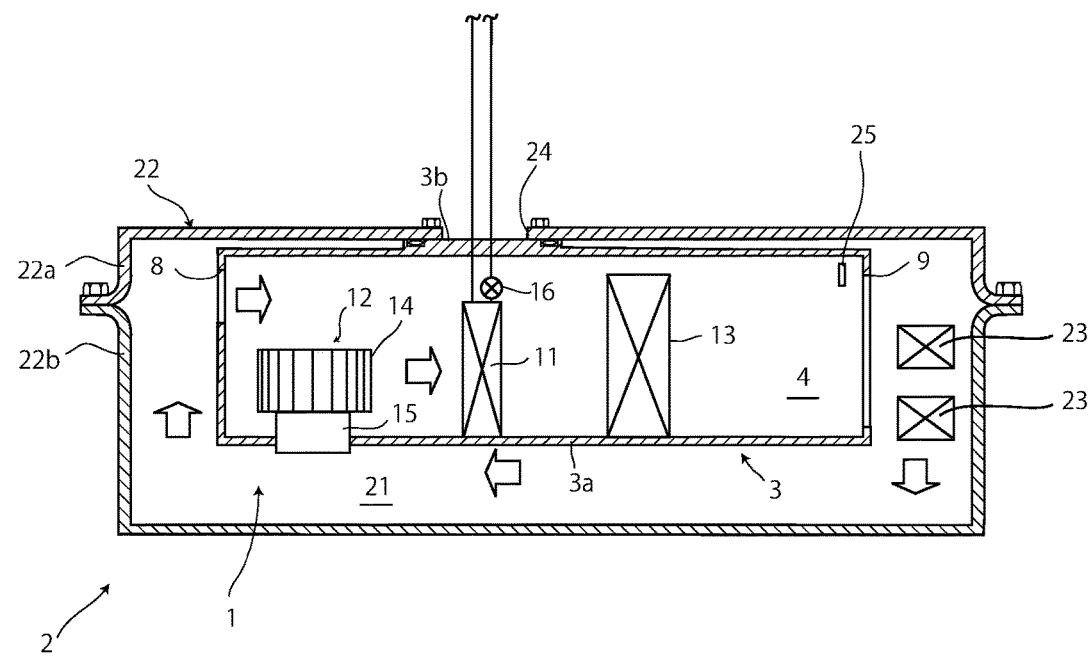
FIG. 13 is a cross-sectional view showing the whole constitution of a battery module according to an embodiment 4.
Figure 14:
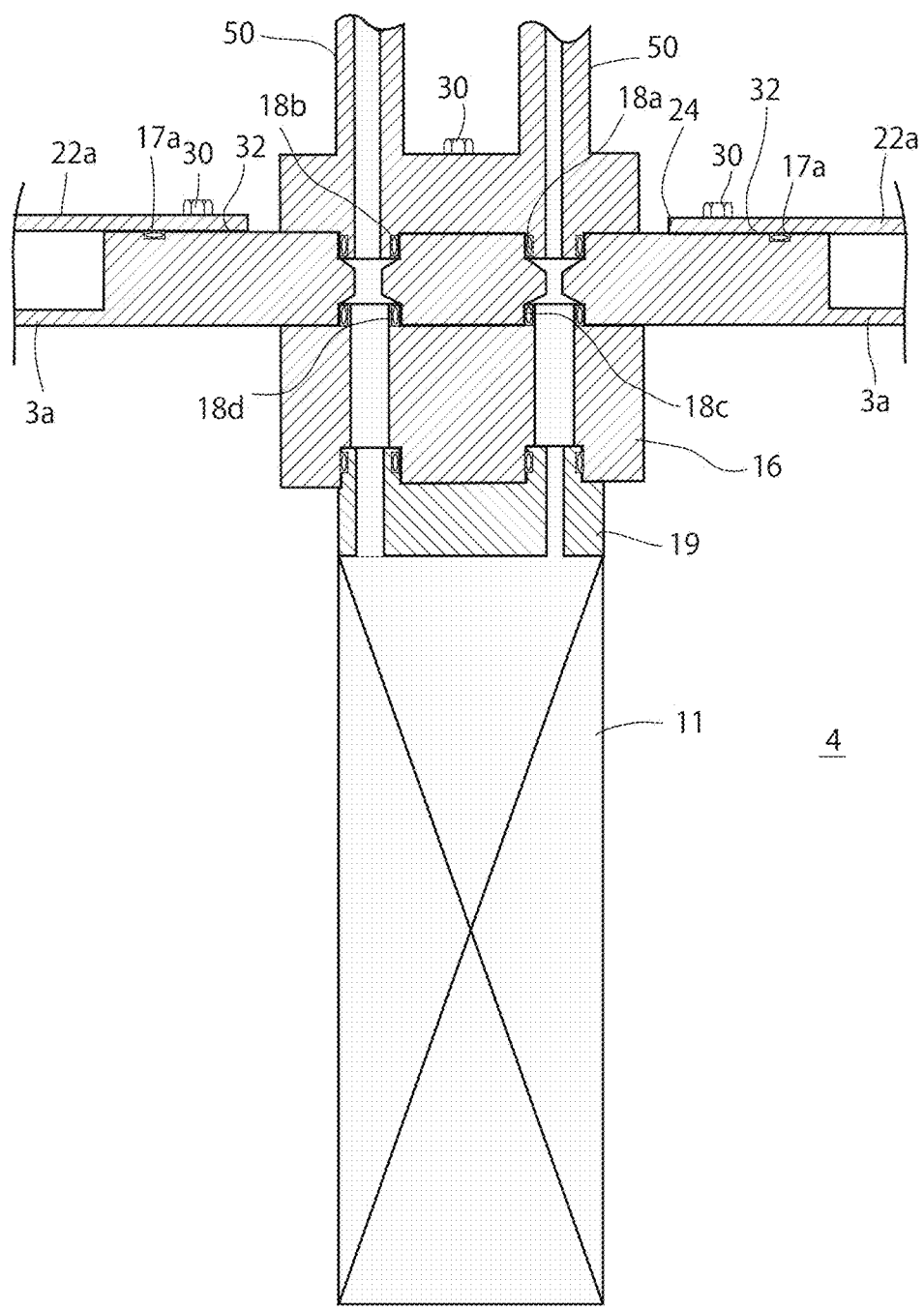
FIG. 14 is an enlarged cross-sectional view showing a mounting state of a unit case.
Figure 15:
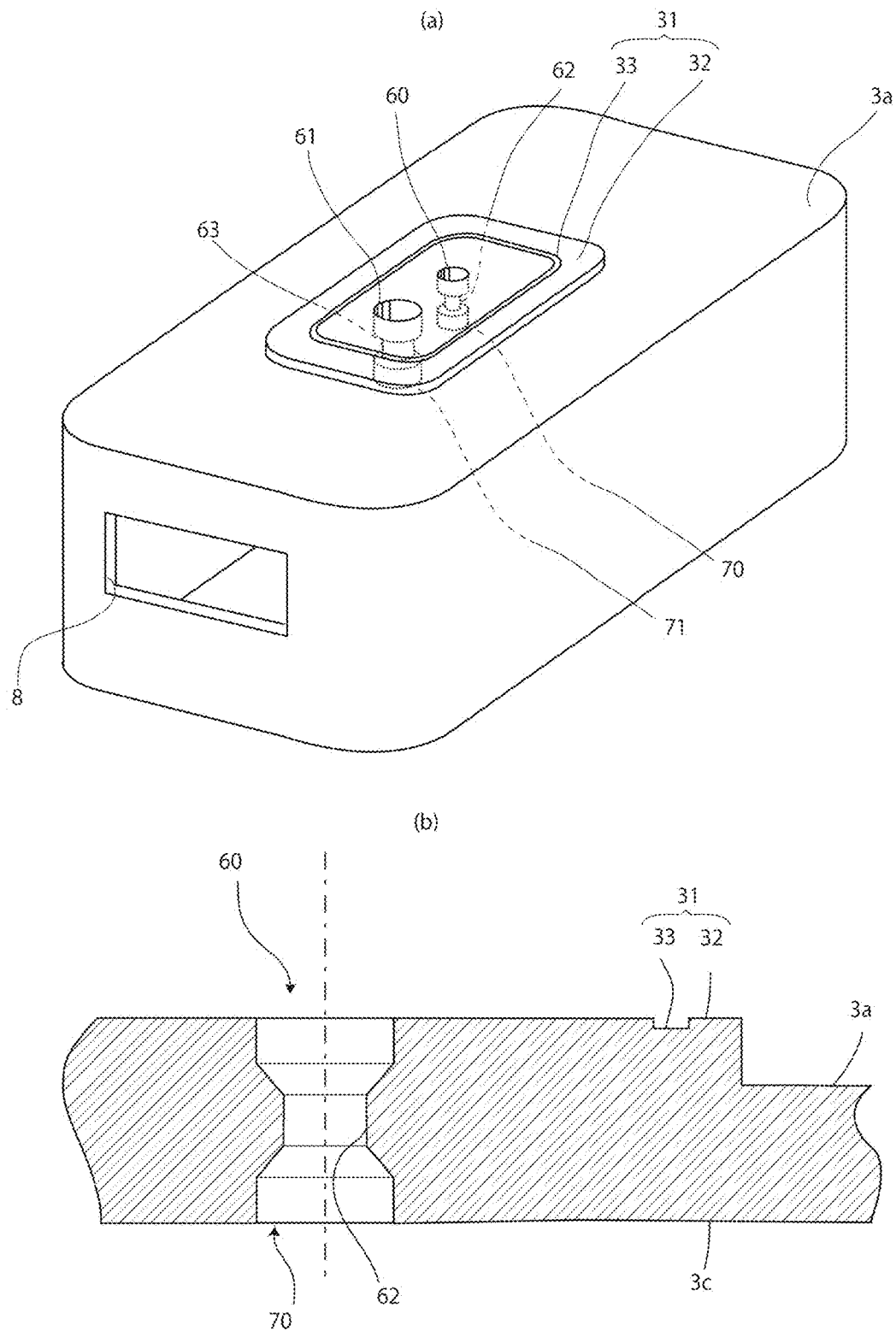

To be more specific, as shown in FIG. 13 to FIG. 15, a unit case 3 is formed of a raw material having a pressure resistance to a refrigerant and capable of preventing the permeation of the refrigerant such as metal or a resin having a high strength. A module opening sealing portion 31 which can close a module opening 24 formed on the module case 22 is formed on the unit case 3, and the unit case 3 is integrally formed with a sealing member 3b.

The module opening sealing portion 31 is formed on a unit case body 3a in a projecting manner toward the outside of the unit case 3 from an inner side of a wall surface of the unit case body 3a. The module opening sealing portion 31 has a module sealing surface 32 which closes the module opening 24 from an internal space 21 side. A groove 33 which accommodates a sealing material 17a for preventing the intrusion of water from the outside is formed in the module sealing surface 32.

An outer high-pressure pipe connecting portion 60 and an outer low-pressure pipe connecting portion 61 which are connected to refrigerant pipes 50 are formed on the module sealing surface 32. An inner high-pressure pipe connecting portion 70 and an inner low-pressure pipe connecting portion 71 which are connected to an expansion device 16 are formed on a surface 3c of the unit case body 3a which faces the inside of the unit case body 3a. The outer high-pressure pipe connecting portion 60 and the inner high-pressure pipe connecting portion 70 are communicated with each other through a first communication hole 62, and the outer low-pressure pipe connecting portion 61 and the inner low-pressure pipe connecting portion 71 are communicated with each other through a second communication hole 63.

The outer high-pressure pipe connecting portion 60 and the outer low-pressure pipe connecting portion 61 are formed so as to allow the insertion of connecting portions of the refrigerant pipes 50 thereto, and a leakage of a refrigerant can be prevented by sealing materials 18a, 18b such as O-rings provided to the refrigerant pipes 50. The inner high-pressure pipe connecting portion 70 and the inner low-pressure pipe connecting portion 71 are formed so as to allow the insertion of connecting portions of the expansion device 16 on a sealing member 3b side thereto, and a leakage of the refrigerant can be prevented by sealing materials 18c, 18d such as O-rings provided to the connecting portions.

As described above, by forming the sealing member 3b as an integral part of the unit case 3 per se, the number of parts can be decreased. While the unit case 3 is formed using a resin which has favorable resistance to permeation of a refrigerant (restricting a refrigerant permeation amount to a small amount) and can withstand a pressure of a refrigerating cycle, the unit case 3 may be suitably designed such that the unit case 3 is formed using a resin having a high strength and a resin which has high resistance to permeation of a refrigerant is applied to or filled in portions of the first communication hole 62 and the second communication hole 63 which are brought into contact with a refrigerant (inner peripheral surfaces of the first communication hole 62 and the second communication hole 63). By forming the unit case 3 using a resin as described above, it is possible to realize the reduction of weight of the device.

In this embodiment, the module opening sealing portion 31 is formed in a projecting manner from the inner side of the unit case body 3a in the surface direction. However, as shown in FIG. 16, to facilitate the positioning between the module opening sealing portion 31 and the module opening 24, a projecting portion 38' which projects in the direction toward the outside of the unit case 3 may be formed on the module sealing surface 32.

Figure 18:
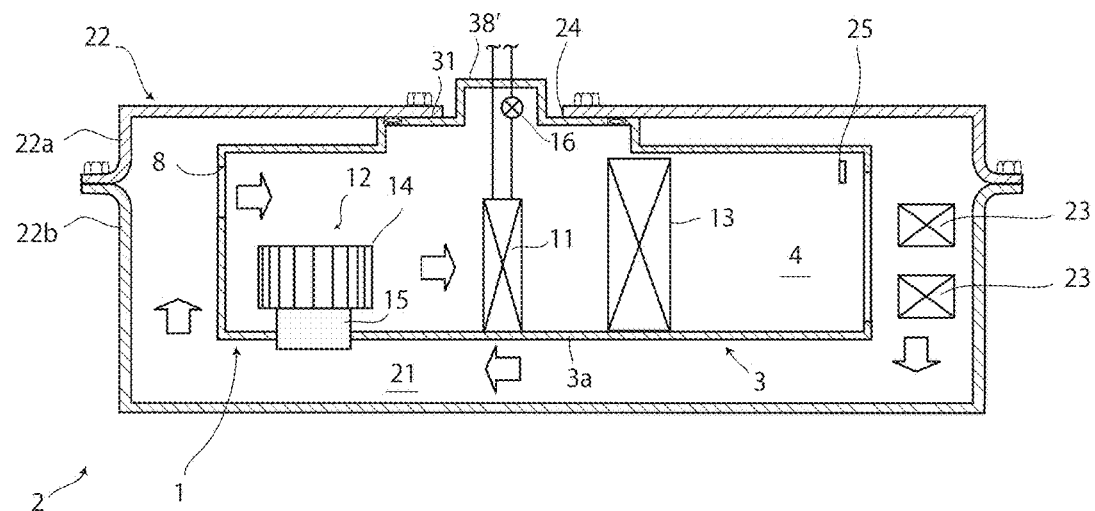
FIG. 18 is a cross-sectional view showing the whole constitution of another example of the battery module according to the embodiment 4.

In this embodiment, a thickness of a wall surface of the unit case 3 on which the module opening sealing portion 31 is formed is set larger than a thickness of other wall surfaces. However, as shown in FIG. 17, wall surfaces of the unit case may be formed with a uniform thickness. When wall portions of the unit case 3 are formed with a uniform thickness, as shown in FIG. 18, to facilitate the positioning between the module case 22 and the unit case 3, a projecting portion 38' which projects in the direction toward the outside of the unit case 3 may be formed on the module opening sealing portion 31.

Figure 19:
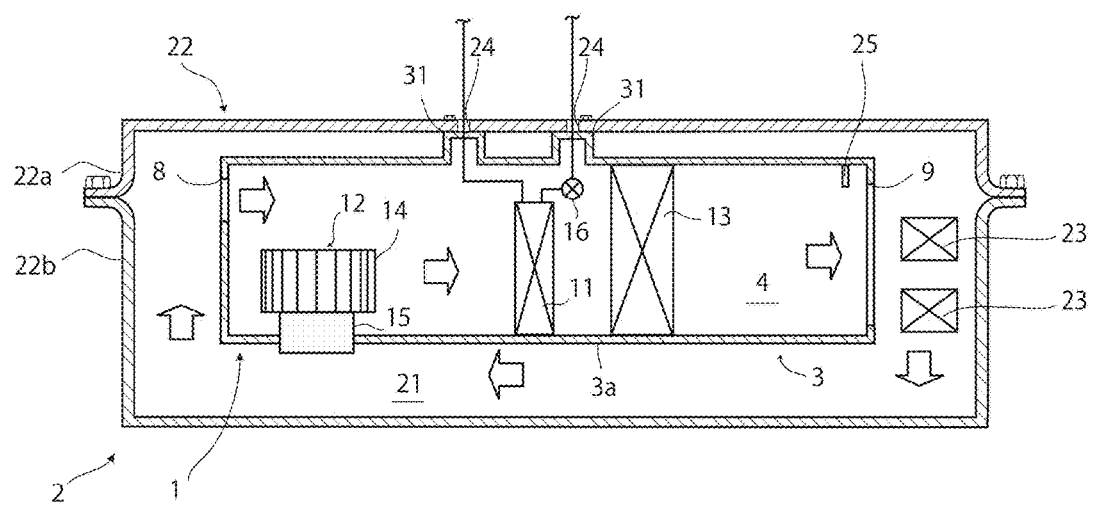
FIG. 19 is a cross-sectional view showing the whole constitution of another example of the battery module according to the embodiment 4.

Still further, as shown in FIG. 19, when a plurality of module openings 24 (two module openings in the drawing) are formed in the module case 22, the module openings 24 may be sealed by forming module opening sealing portions 31 the number of which corresponds to the number of module openings 24 on the unit case 3.

Figure 20:
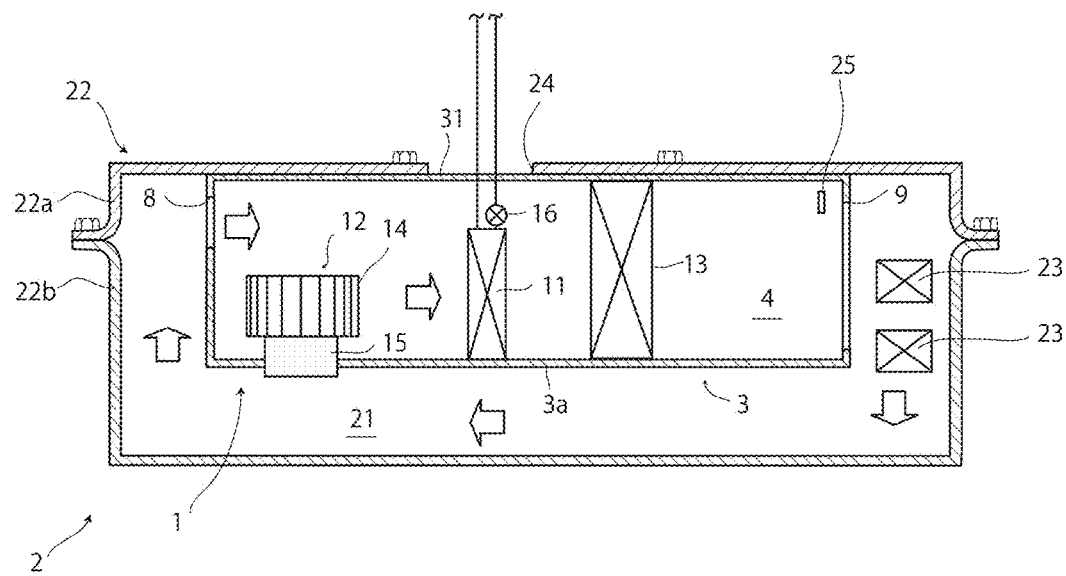
FIG. 20 is a cross-sectional view showing the whole constitution of another example of the battery module according to the embodiment 4.

In this embodiment, the module opening sealing portion 31 is formed in a projecting manner in the direction toward the outside of the unit case from the inner side of the wall surface of the unit case 3. However, as shown in FIG. 20, the module opening sealing portion 31 may be formed on a wall surface of the unit case 3 formed in a planar shape.

Figure 21:
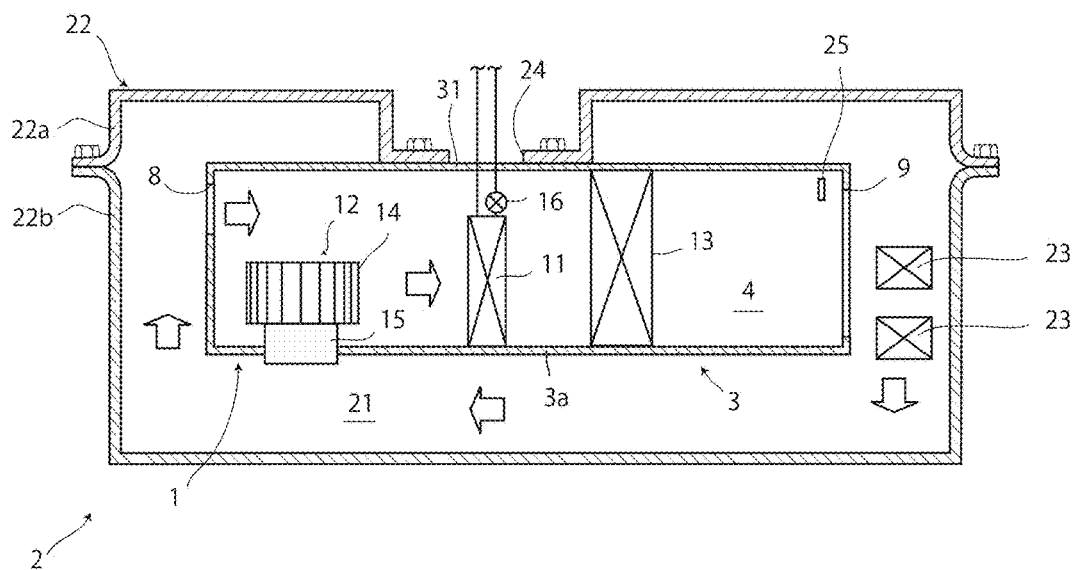
FIG. 21 is a cross-sectional view showing the whole constitution of another example of the battery module according to the embodiment 4.

The shape of the module case 22 is not limited. For example, this embodiment is applicable to the case where the module opening 24 is formed in a recessed portion of the module case 22 as shown in FIG. 21.

Figure 22:
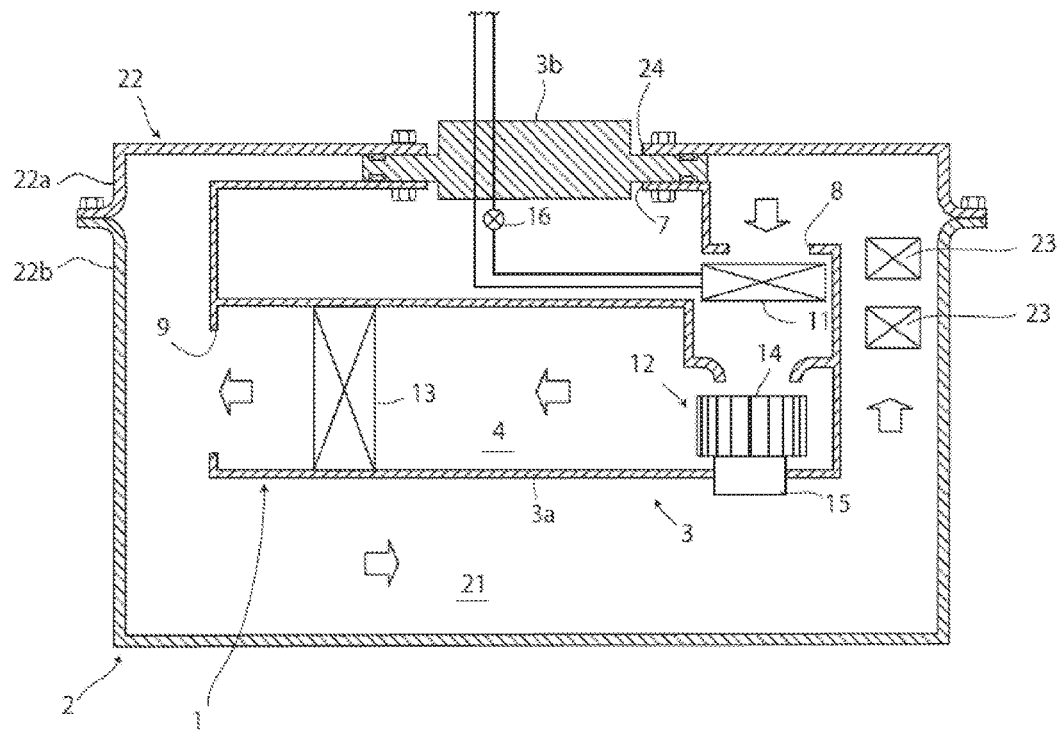
FIG. 22 is a cross-sectional view of a battery module on which a battery temperature control unit is mounted in a state where air flow passages are arranged orthogonal to each other.
Figure 23:
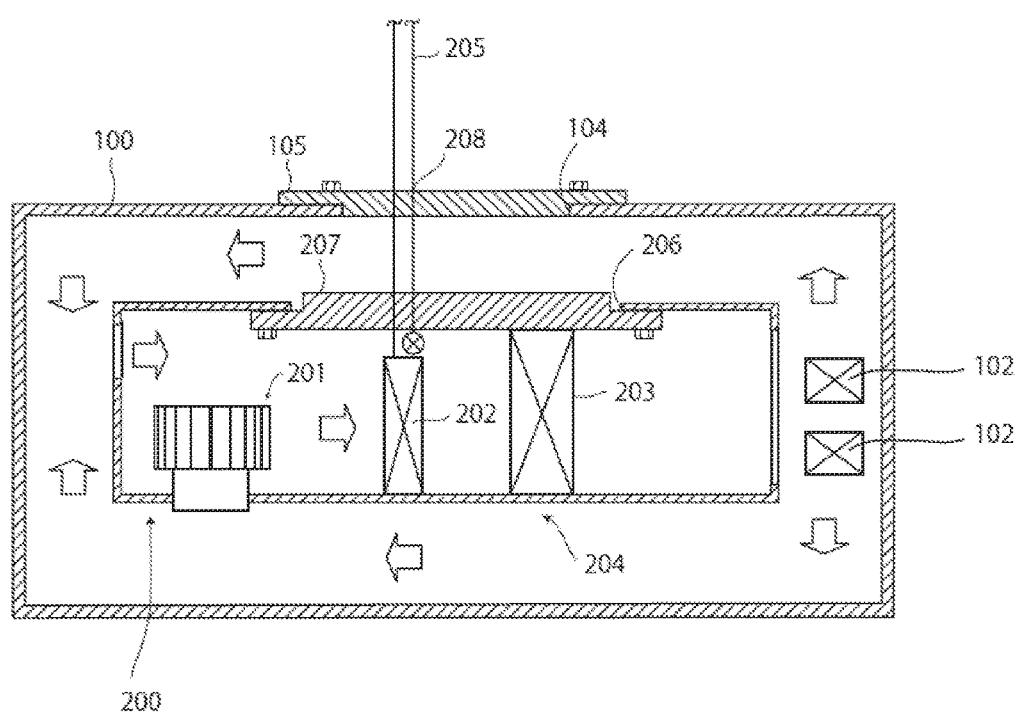
FIG. 23 is a cross-sectional view showing the whole constitution of a conventional battery module.

It is needless to say that, the above-mentioned embodiments can be suitably changed in design without departing from the gist of the present invention. For example, the constitution of the battery temperature control unit 1 has been explained by reference to FIG. 1 such that the air flow passage is formed of the suction hole 8, the blower 12, the evaporator 11, the heater core 13 and the blow-off hole 9 in this order. However, as shown in FIG. 22, the position of the blower 12 and the position of the evaporator 11 may be reversed and, at the same time, an air flow passage from the suction hole 8 to the blower 12 through the evaporator 11 may be arranged to orthogonal to an air flow passage from the blower 12 to the blow-off hole 9 through the heater core 13. In the blower 12 which includes the impeller 14, the direction of flow of suction air and the direction of flow of blow-off air orthogonally intersect with each other. By adopting the above-mentioned arrangement, the temperature control unit can be efficiently operated.

In the above-mentioned embodiments, the evaporator is used as the heat exchanger and a leakage of heating medium from the evaporator is prevented. However, the present invention is not limited to such a constitution, and the present invention may be carried out such that a hot-water-type heater core is adopted as the heat exchanger and a leakage of heating medium from the hot-water-type heater core is prevented.

REFERENCE SIGNS LIST

1: Battery temperature control unit
2: Battery module
11: Evaporator
21: Internal space
22: Module case
22a: Lid member
22b: Box member
23: Battery
24: Module opening
3: Unit case
3a: Unit case body
3b: Sealing member
31: Module opening sealing portion
32: Module sealing surface
36: First communication hole
37: Second communication hole
38: First projecting portion
38a: Top surface of first projecting portion
4: Air flow passage
41: Unit opening sealing portion
42: Unit sealing surface
48: Second projecting portion
48a: Top surface of second projecting portion
7: Unit opening

The invention claimed is:

1. A battery temperature control unit arranged in an internal space of a module case of a battery module for controlling a temperature of the internal space of the battery module where a battery is arranged outside the battery temperature control unit and inside the internal space of the module case, wherein the battery temperature control unit includes:
a unit case which includes an air flow passage in the inside thereof and is arranged in the internal space; and
a heat exchanger arranged in the air flow passage;
the unit case includes:
a module opening sealing portion which seals a module opening formed in a wall surface of the module case; and
the module opening sealing portion includes:
a module sealing surface which closes the module opening from an internal space side;
a first communication hole which allows the outside and the inside of the unit case to communicate with each other and through which a heating medium which is directed toward the inside of the unit case from the outside of the module case flows; and
a second communication hole which allows the outside and the inside of the unit case to communicate with each other and through which the heating medium which is directed toward the outside of the module case from the inside of the unit case flows;
wherein the unit case is constituted of a unit case body having the air flow passage in the inside thereof and one sealing member, and
the sealing member includes the module opening sealing portion and a unit opening sealing portion which closes a unit opening formed in a wall surface of the unit case body.

2. The battery temperature control unit according to claim 1, wherein the heat exchanger is an evaporator.

3. The battery temperature control unit according to claim 1, wherein the module opening sealing portion includes a projecting portion which is formed in a projecting manner in a direction toward the outside of the unit case from an inner side of the module sealing surface in a surface direction and has a cross-sectional shape smaller than a cross-sectional shape of the module opening, and
the first communication hole and the second communication hole are formed so as to make a top surface of the projecting portion and a surface of the module opening sealing portion which faces the inside of the unit case communicate with each other.

4. The battery temperature control unit according to claim 3, wherein the heat exchanger is an evaporator.

5. The battery temperature control unit according to claim 1, wherein the unit opening sealing portion includes a second projecting portion which is formed in a projecting manner in a direction toward the inside of the unit case from an inner side of a unit sealing surface in a surface direction and having a cross-sectional shape than smaller than a cross-sectional shape of the unit opening, and
the first communication hole and the second communication hole are formed so as to make a surface of the module opening sealing portion which faces the outside of the unit case and a top surface of the second projecting portion communicate with each other.

6. The battery temperature control unit according to claim 5, wherein the heat exchanger is an evaporator.

7. The battery temperature control unit according to claim 1, wherein the unit opening sealing portion includes a unit sealing surface which closes the unit opening from the outside of the unit case.

8. The battery temperature control unit according to claim 7, wherein the heat exchanger is an evaporator.

9. The battery temperature control unit according to claim 1, wherein the unit opening sealing portion includes a unit sealing surface which closes the unit opening from the inside of the unit case.

10. The battery temperature control unit according to claim 9, wherein the heat exchanger is an evaporator.

* * * * *